Jan. 19, 1932.  M. SHOELD  1,841,644
SULPHUR RECOVERY AND PURIFICATION
Filed Oct. 18, 1927
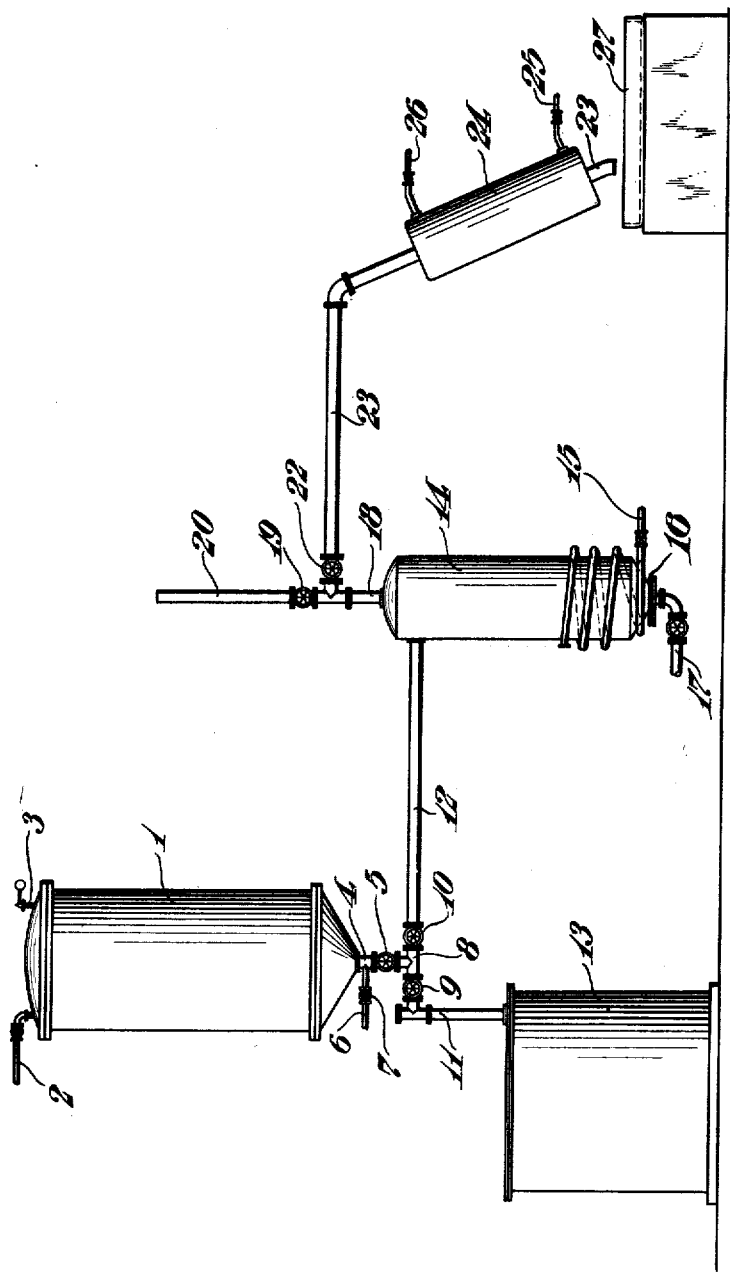
INVENTOR.
Mark Shoeld
BY
Jesse R. Langley
ATTORNEY though it is not limited to either

UNITED STATES PATENT OFFICE

MARK SHOELD, OF MOUNT LEBANON TOWNSHIP, ALLEGHENY COUNTY, PENNSYLVANIA, ASSIGNOR TO THE KOPPERS COMPANY, A CORPORATION OF DELAWARE

SULPHUR RECOVERY AND PURIFICATION

Application filed October 18, 1927. Serial No. 226,872.

This invention relates to the recovery and purification of sulphur from slurries containing it and more particularly to the treatment of a particular kind of such slurry.

In the purification of fuel gas by removing therefrom hydrogen sulphide and analogous impurities according to certain modern processes, sulphur removed from the gas by an absorbent liquid is liberated upon aeration of the thereby fouled liquid for the purpose of regenerating it for further use. This sulphur usually separates as a froth or foam which is removed from the surface of the aerated liquid in the form of a slurry. This slurry may contain up to 20% of sulphur by weight, but a typical example of such a slurry has been found to contain about 10% of sulphur.

By reason of the fact that the sulphur has been precipitated in a liquid as the result of a chemical reaction and probably also by reason of the nature of the chemical reagents present and the manner of aeration, sulphur liberated in such processes and generally known as "gas purification sulphur" is unique in character. For example, it possesses an extremely small particle size and suspensions of it are sometimes very difficult of sedimentation. In general, such slurries differ materially from other sulphur-water mixtures and can not always be satisfactorily treated according to the usual methods for recovering and purifying their sulphur contents.

An object of my invention is to provide a process of recovering sulphur from slurries or similar mixtures.

A further object of my invention is to provide a process of and apparatus for purifying sulphur recovered from such slurries.

My invention has for its further objects such other operative advantages or results as may hereinafter be found to obtain.

According to my invention, I accomplish a crude purification of gas purification sulphur by heating to carefully regulated temperatures and I subsequently treat the thereby partially purified sulphur for the removal of certain organic materials that are present therein and for the recovery of a substantially pure sulphur product.

In order that my invention may be clearly set forth and understood, I now describe, with reference to the accompanying drawing, the preferred manner in which it is embodied and performed.

In the drawing, the single figure is an elevational and somewhat diagrammatic view of apparatus for recovering sulphur from gas purification slurry and for purifying the thereby recovered sulphur.

The initial separation of the sulphur from the slurry is accomplished in an autoclave 1 that is provided with an inlet pipe 2, a safety valve 3 and an outlet pipe 4. The outlet pipe 4 is further provided with a valve 5 and communicates with a steam line 6, having a valve 7. The steam line 6 is provided primarily for heating purposes, but the steam here introduced may also assist in discharging the contents of the autoclave. Heating may be otherwise accomplished, as for example, by means of indirect steam, in which case the autoclave 1 is provided with a steam jacket.

The outlet pipe 4 preferably terminates in a T connection 8 that is provided on either side with valves 9 and 10, through which the T 8 communicates with conduits 11 and 12, respectively. The conduit 11 leads to a suitable container 13, while the conduit 12 leads to a still 14. The still 14 is preferably of cylindrical configuration and of cast-iron construction, though it is not limited to either of these details of construction. The still 14 is provided with heating means 15, a flanged bottom 16 through which is introduced an air supply line 17, and a vertical outlet pipe 18 having a valve 19 and an extension or vent 20. Communicating with the outlet 18 through a valve 22 is a vapor line 23 which passes through a condenser 24 that is provided with inlet and outlet pipes 25 and 26 for steam, hot water or the like. The vapor pipe 23 discharges into a flat receiver 27.

The slurry to be treated is preferably first thickened to a consistency easily handled by a suitable pump and is then forced through the line 2 into the autoclave 1. Instead of treating the thickened slurry, however, it is desirable in some cases to treat the sulphur cream produced by filtering the slurry. Such material, however, is included within the scope of the term "slurry" as used herein.

The valve 5 now being closed, steam under pressure is admitted from line 6 by opening valve 7 until a temperature of from about 140° to about 160° C. is obtained in the autoclave 1. The point of maximum fluidity of sulphur is usually stated to lie between about 115° and 120° C., and in some processes temperatures somewhat higher than this, for example, about 125° C. have been employed. I have found, however, that these temperatures are not sufficiently high to accomplish the desired result when gas purification sulphur is treated, and I accordingly employ temperatures such as those given hereinabove and which are considerably above the melting point of sulphur.

The slurry is allowed to remain in the autoclave 1 subject to this temperature for about 30 minutes to one hour, during which time the sulphur present in the slurry is substantially completely brought to a molten condition. The molten sulphur accumulates in the bottom of the autoclave 1 and is drawn off by opening valves 5 and 10.

When all the sulphur has been drawn off, which is indicated by hissing of steam at the outlet 4, the valve 10 is closed and valve 9 is opened and the remaining liquor is blown into the receiver 13.

The molten sulphur, which has been discharged through line 12 into the still 14, is of a fair degree of purity. Analysis of a typical sample of sulphur showed an ash content of less than 0.03%, indicating a clean separation between the sulphur and the various salts of the gas purification liquor.

Further analysis of the same sulphur indicated only a trace or less than 0.02% of arsenic, a constituent of the original gas purification liquor which it is for some purposes extremely desirable to remove as completely as possible from the gas purification sulphur. However, this sulphur, although satisfactory for many purposes, still contains small amounts of certain organic materials present during the gas purification process and which it is desirable to remove.

For this purpose the sulphur in the still 14 is heated by means of the heating device 15 to a temperature of from 350 to 400° C. and preferably about 375° C. During the period of heating foaming takes place, probably due to the escape of volatile oils. Excessive foaming at any time may be prevented if, instead of filling the still 14 and subsequently heating the same, the still is maintained at about 375° C. or thereabouts while the molten sulphur from the previous operation is slowly run into the hot still. When foaming has ceased, air under pressure is introduced through line 17. The air passes upward through the molten sulphur and the resulting gas escapes through outlet 18 and vent 20.

The vent 20 serves the purpose of allowing any sulphur present in this gas to condense or to cool below its ignition point before it enters the atmosphere and thus minimizes the hazard of fire. For this purpose, the extension 20 should be long enough to be provided with a steam jacket to cool any sulphur vapor or flowers of sulphur carried therethrough so that it condenses and runs back into the still.

The air is allowed to bubble through the sulphur to from about 15 to 30 minutes, which is usually sufficient to remove or fix the organic impurities so that they will not distill over with the sulphur and valve 19 is then closed and valve 22 is opened. Afterwards the temperature of the sulphur in the still 14 is raised to about 450° C.

The sulphur now distills, passing through conduits 18 and 23 and condenser 24. The temperature of the condenser 24 is preferably maintained at from about 125° to 135° C. and the resultant condensed molten sulphur runs out into the receiver 27 for cooling.

Any deposit remaining in the still 14, such as a fluffy carbon deposit, may be removed when desired through the flanged opening 16.

In my process and apparatus, I am able to produce sulphur of substantially complete purity from gas purification slurry. Analysis of the purified sulphur recovered shows complete absence of ash, (the accuracy limit of the determination being 0.005%). The arsenic content of this sulphur when determined by the Sanger-Black test is found to be less than 0.003%.

The process and apparatus of the present invention are simple but very effective in treating sulphur slurries of the character indicated and in obtaining therefrom a sulphur product purified to an exceptionally high degree.

While I have described my invention with respect to a specific example and embodiment, it is not limited to such illustrative instance or instances except as specified in the following claims.

I claim as my invention:

1. The process of purifying sulphur which comprises heating it to a temperature of from about 350° to about 400° C. and treating it with a current of air at that temperature.

2. The process of purifying sulphur which comprises treating it with a current of air at a temperature of from about 350° to about 400° C. until organic materials are removed therefrom and subsequently distilling and condensing the sulphur.

3. The process of recovering sulphur from slurry containing it which comprises heating the slurry to a temperature substantially above that of the melting point of sulphur, withdrawing the molten sulphur, aerating it at a temperature of from about 350° to about 400° C., and subsequently distilling the sulphur.

In testimony whereof, I have hereunto subscribed my name this 15th day of October, 1927.

MARK SHOELD.